Feb. 21, 1933.  C. C. MITCHELL  1,898,884
RETARDING GEAR FOR CATAPULTS
Filed Sept. 30, 1931
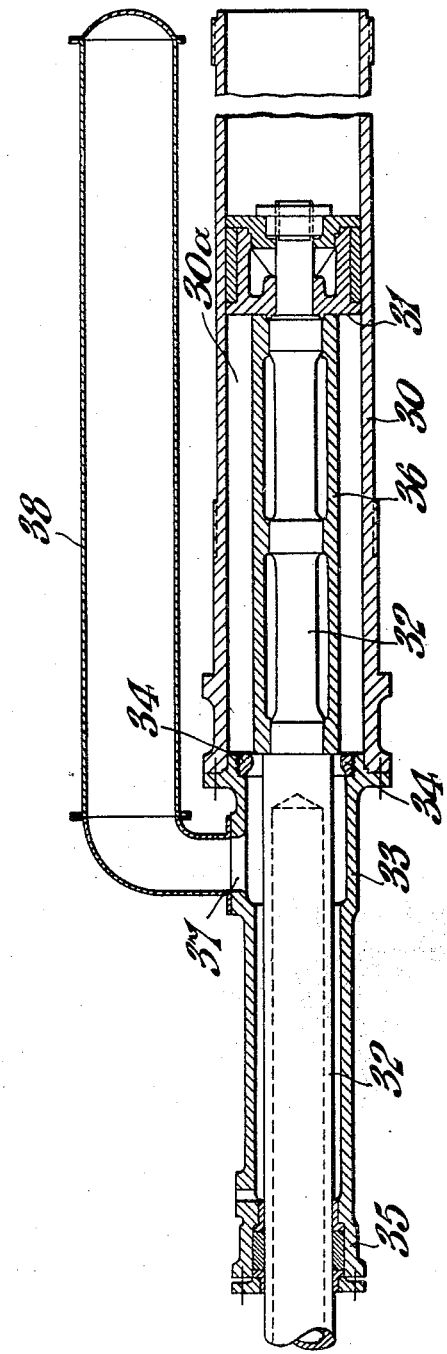
Inventor
Colin C. Mitchell.
By William C. Linton.
Attorney.

Patented Feb. 21, 1933

1,898,884

UNITED STATES PATENT OFFICE

COLIN CAMPBELL MITCHELL, OF CORSTORPHINE, EDINBURGH, SCOTLAND

RETARDING GEAR FOR CATAPULTS

Application filed September 30, 1931, Serial No. 566,145, and in Sweden March 31, 1931.

This invention relates to the catapult type of apparatus for launching aircraft, such as apparatus having an aircraft carrying trolley and cable and sheave gear operated by the piston of a power cylinder, and has for its object to provide more efficient means for applying a retarding force for bringing the impelling piston and moving parts to rest after imparting an accelerating motion to the aircraft.

The present invention comprises apparatus applicable to aircraft launching apparatus of the kind having an aircraft carrying trolley propelled through cable and sheave gear from a prime mover along a track which can be increased in length by one or more extending portions.

The apparatus is so constructed that the first portion of the movement of the piston of the motor is an acceleration stroke and corresponds to the distance travelled by the carriage or trolley during which an accelerating motion is imparted to it by the piston, and at the end of which the aircraft is released from its carriage or trolley and launched.

The remaining portion of the movement of the piston of the motor is a retarding stroke, as at the moment of launching of the aircraft, the carriage, piston, and other moving parts are moving at a high velocity. and it is necessary to apply a retarding force to these parts in order to bring them smoothly to rest at the extreme limit of their travel.

The accompanying drawing which is more or less diagrammatic is a sectional elevation of the retarding mechanism.

Mounted on the main girder structure of the apparatus is a power cylinder 30 having a piston 31 which forms the prime mover of the launching mechanicam and may be operated by compressed air, hydraulic power, or by gas pressure consequent upon firing a charge of propellant such as cordite. If operated by compressed air the air reservoir may be mounted on the main girder structure, or may be positioned independently of the catapult and the air passed through a pipe which passes through the central pivot of the breech end 9 of the operating cylinder. If operated by gas pressure an explosion chamber and breech block may be fitted at the breech end of the operating cylinder of the prime mover.

In the apparatus for retarding the motion of the trolley and other moving parts as illustrated in Figure 1 the prime mover consists of the cylinder 30 of which the piston 31 is secured to a piston rod 32. In order to provide a fluid cushioning device in the retarding end of the power cylinder 30, to such retarding end is secured a cylindrical extension 33 provided with a neck ring 34 at its inner end and at its outer end with a stuffing box 35 for the piston rod 32 which is connected at its inner end to the motor piston 31. To the leading end of the piston 31 is attached a cut-off extension 36 in the form of a sleeve which at its leading end is smaller in diameter than the bore of the neck ring 34 and tapers or is of a curved form to within a short distance of the piston end where its diameter is such as to allow a fine clearance between it and the neck ring 34, from the end of the tapered or curved portion to the piston end of cut-off extension 36 is made parallel. Or the cut-off extension of the piston may be parallel throughout its length, its diameter being such as to allow a fine clearance between it and the neck ring 34, and have longitudinal grooves which decrease in area from the leading end to the piston end. The motive fluid is admitted to the power cylinder 30 behind the piston 31, and the annular space 30a in front of the piston 31 is filled with a retarding fluid which may be a liquid or a gas or partly liquid and partly gaseous. In the cylindrical extension is provided a passage 37 leading to a receiver 38 for the cushioning fluid.

In the operation of the device, during the accelerating stroke of the piston 31 the retarding fluid has a free flow from the power cylinder 30 through the annular space between the piston rod 32 and the neck ring 34. At the end of the accelerating stroke and the beginning of the retarding stroke the leading end of the cut-off extension 36 of the piston 31 enters the neck ring 34, and the consequent reduction of the discharge area causes a rise in pressure in the retarding fluid and a corresponding retarding force on the front of the piston 31. The retarding force is applied to the aircraft carriage or trolley and other moving parts by the interconnecting ropes and sheave gear or by any suitable mechanical means. As the speed of the piston 31 decreases the pressure in the fluid and the consequent retarding force on the piston is maintained by the continued reduction of the annular area between the neck ring and the cut-off extension of the piston due to the taper or curve of, or of the area of the longitudinal grooves in, the cut-off extension 36 of the piston. After the tapered, curved or grooved portion of the cut-off extension 36 has passed through the neck ring, the parallel portion of the cut-off extension 36 enters the neck-ring, and the portion of the retarding fluid remaining forms a cushion between the power piston 31 and the face of the neck ring 34 and end portion of the cylindrical extension 33 to which it is attached, and the cushioning fluid is slowly dissipated through the fine clearance between the neck-ring and cut-off extension, thereby allowing the piston and hence the carriage or trolley and other moving parts to come smoothly to rest at the limit of their travel.

The above retarding device may be applied to any suitable moving part of a catapult or other device for launching aircraft.

What I claim and desire to secure by Letters Patent is:—

1. Impelling apparatus for an aircraft launching device, comprising a power cylinder, an aircraft impelling piston rod having a piston operating in the power cylinder, a fluid cushioning chamber, a cylindrical extension on the front end of the cylinder provided at its outer end with a stuffing box for the piston rod of the impelling piston and at its inner end with a neck ring through which passes freely the piston rod, the fluid cushioning chamber being formed in the front end of the power cylinder, and the neck ring being of such a size as to leave between it and the piston rod a restricted opening for the escape of fluid from the front end of the power cylinder into the cylindrical extension of the cylinder.

2. Impelling apparatus for an aircraft launching device, comprising a power cylinder, an aircraft impelling piston rod having a piston operating in the power cylinder, a fluid cushioning chamber, a cylindrical extension on the front end of the cylinder provided at its outer end with a stuffing box for the piston rod of the impelling piston and at its inner end with a neck ring through which passes freely the piston rod, the fluid cushioning chamber being formed in the front end of the power cylinder, and the piston rod having an enlarged portion extending from the piston to the neck ring and being of such a size as to leave between it and the neck ring a restricted opening for the escape of fluid from the front end of the power cylinder into the cylindrical extension of the cylinder.

3. Impelling apparatus for an aircraft launching device, comprising a power cylinder, an aircraft impelling piston rod having a piston operating in the power cylinder, a fluid cushioning chamber, a cylindrical extension on the front end of the cylinder provided at its outer end with a stuffing box for the piston rod of the impelling piston and at its inner end with a neck ring through which passes freely the piston rod, the fluid cushioning chamber being formed in the front end of the power cylinder, and the piston rod having an enlarged portion extending from the piston to the neck ring and being of such a size and shape as to leave between it and the neck ring a restricted opening of gradually reducing area as the piston advances for the escape of fluid from the front end of the power cylinder into the cylindrical extension of the cylinder.

4. Impelling apparatus for an aircraft launching device, comprising a power cylinder, an aircraft impelling piston rod having a piston operating in the power cylinder, a fluid cushioning chamber, a cylindrical extension on the front end of the cylinder provided at its outer end with a stuffing box for the piston rod of the impelling piston and at its inner end with a neck ring through which passes freely the piston rod, the fluid cushioning chamber being formed in the front end of the power cylinder, and the piston rod having an enlarged portion extending from the piston to the neck ring and being of such a size and tapering throughout its length so as to leave between it and the neck ring a restricted opening of gradually reducing area as the piston advances for the escape of fluid from the front end of the power cylinder into the cylindrical extension of the cylinder.

In testimony whereof, I affix my signature.

COLIN CAMPBELL MITCHELL.